(12) United States Patent
Connor

(10) Patent No.: US 6,779,808 B2
(45) Date of Patent: Aug. 24, 2004

(54) LIMITED ARTICULATION TRAILER AND HITCH SYSTEM

(76) Inventor: Steven Elliott Connor, 4235 Park Brooke Trace, Alpharetta, GA (US) 30022

( * ) Notice: Subject to any disclaimer, the term of this patent is extended or adjusted under 35 U.S.C. 154(b) by 0 days.

(21) Appl. No.: 09/883,592

(22) Filed: Jun. 18, 2001

(65) Prior Publication Data

US 2002/0190499 A1 Dec. 19, 2002

(51) Int. Cl.$^7$ ................................................ B60D 1/01
(52) U.S. Cl. ........................................ 280/494; 280/489
(58) Field of Search ............................ 280/456.1, 462, 280/478.1, 492, 493, 494, 498, 460.1, 489

(56) References Cited

U.S. PATENT DOCUMENTS

| | | | | |
|---|---|---|---|---|
| 2,558,153 A | * | 6/1951 | Peterson | 296/181 |
| 4,239,253 A | * | 12/1980 | Golze | 280/460.1 |
| 4,484,759 A | * | 11/1984 | Zwick | 280/460.1 |
| 4,645,230 A | * | 2/1987 | Hammons | 280/656 |
| 4,664,403 A | * | 5/1987 | Livingston | 280/460.1 |
| 4,968,053 A | * | 11/1990 | Schweigert | 280/460.1 |
| 5,465,992 A | * | 11/1995 | Anderson | 280/477 |
| 5,531,468 A | | 7/1996 | White | |
| 6,042,135 A | * | 3/2000 | Ross | 280/456.1 |

FOREIGN PATENT DOCUMENTS

| | | | | |
|---|---|---|---|---|
| CA | 0596722 | * | 4/1960 | 280/460.1 |

* cited by examiner

*Primary Examiner*—Daniel G. DePumpo
(74) *Attorney, Agent, or Firm*—Jason A. Bernstein; Powell, Goldstein, Frazer & Murphy LLP

(57) ABSTRACT

At least one limited articulating female hitch mechanism and trailer for mounting to a conventional trailer hitch male connection member mounted on a towing vehicle. The hitch mechanisms are pivotal in only the vertical plane. The combination comprises a trailer having a horizontally disposed load supporting frame mounting of swivel (or 360 degree horizontally rotating) wheel assemblies about 360 degrees. This arrangement, coupled with the hitch mechanism, assures the trailer tracks the towing vehicle so that the sides of the towing vehicle and the sides of the trailer remain constantly parallel to each other Reduced trailer size and weight, reduced storage requirements, ease of backup maneuvering and avoidance of road hazards, vehicles, pedestrians and objects is thus facilitated by such arrangement. This system also reduces the weight that is placed upon the towing vehicles rear axle by the trailer hitch mechanism and therefore ensures that the full weight of the front steering wheels of the towing vehicle remain on the road surface so that the towing vehicle steering is not diminished by an uplifting force.

2 Claims, 5 Drawing Sheets

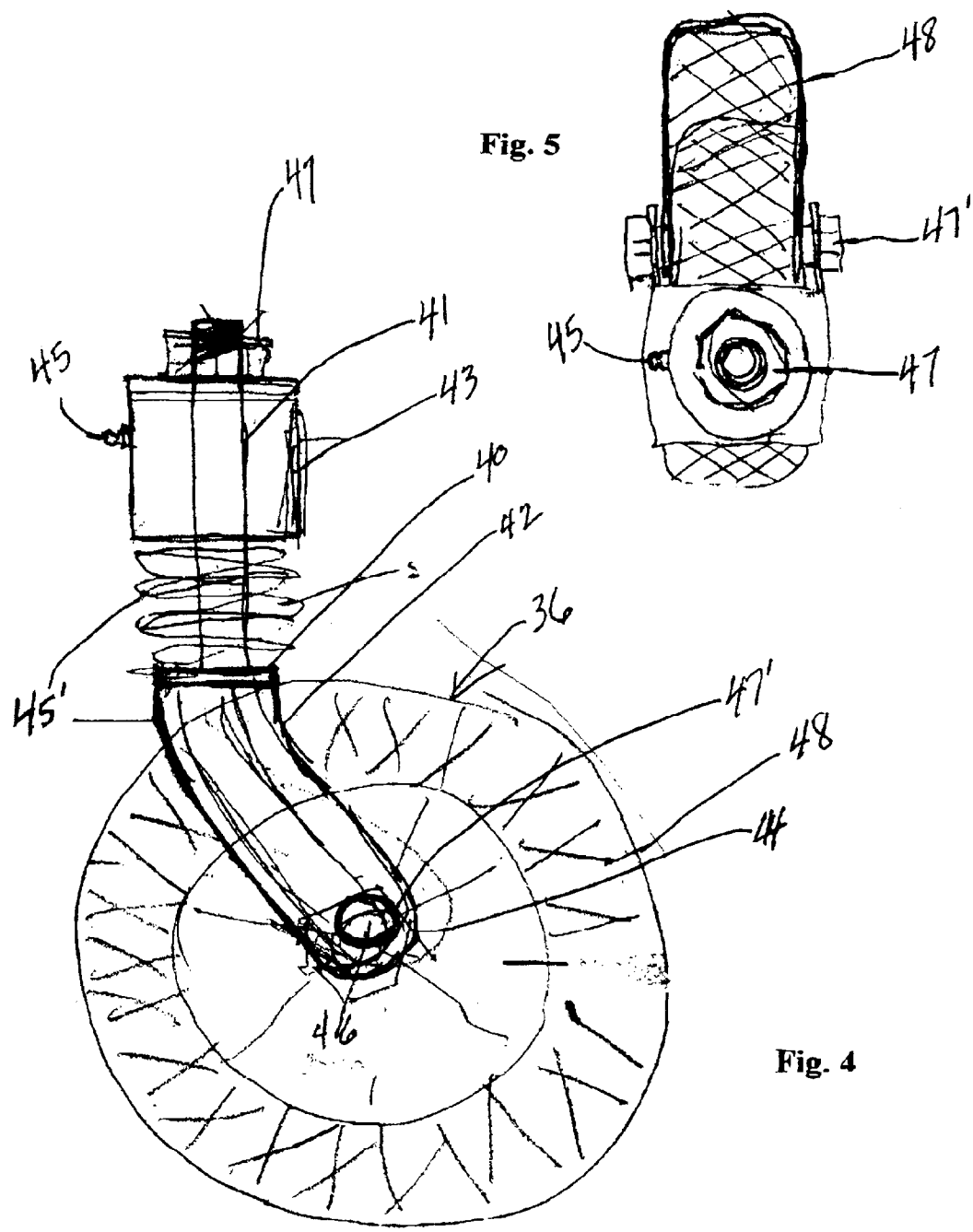

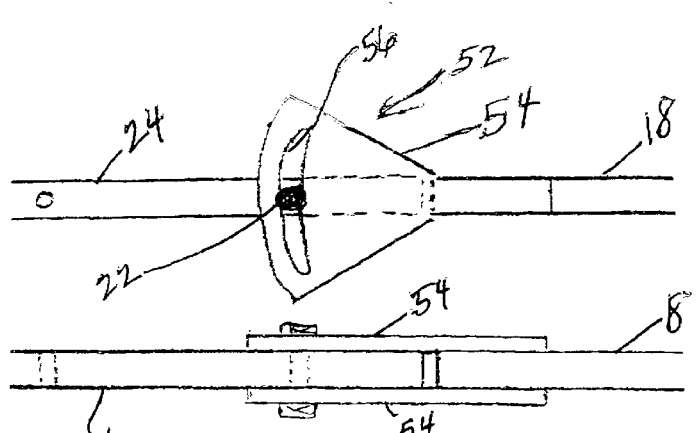
Fig. 8
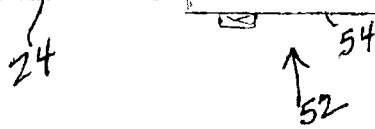
Fig. 9
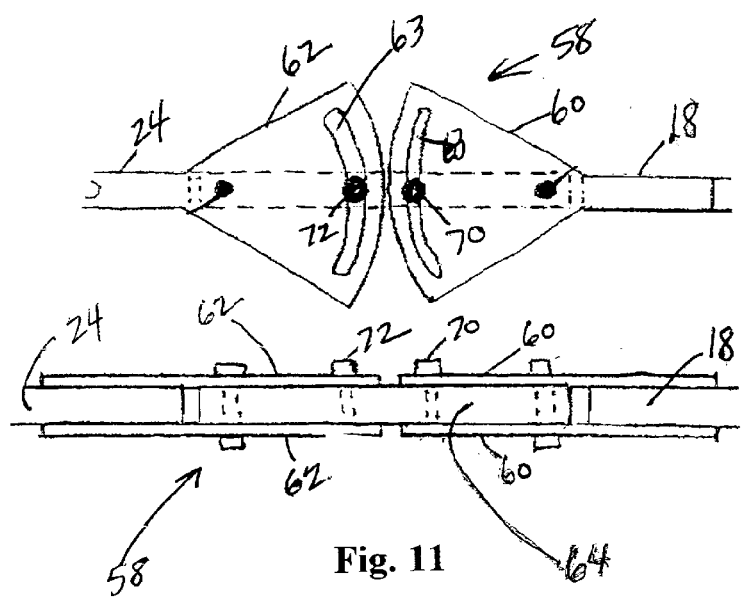
Fig. 10
Fig. 11
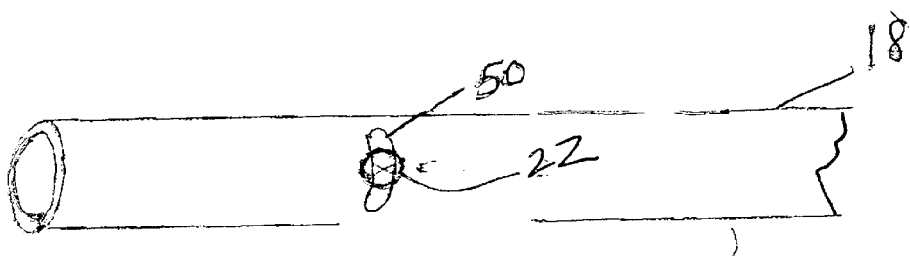
Fig. 7

LIMITED ARTICULATION TRAILER AND HITCH SYSTEM

FIELD OF THE INVENTION

The present invention is directed to limited articulating trailer hitch systems that articulates (or pivots) only in a vertical plane. The hitch system, in combination with a trailer mounting of one or more 360 degree horizontally pivoting wheels, allows the trailer to follow the towing vehicle precisely parallel on turns, simplifying backing up, shortening the length of the trailer, reducing storage space, reducing trailer weight and reducing trailer tongue weight. The sides of the trailer are always parallel to the sides of the towing vehicle.

BACKGROUND OF THE INVENTION

The present invention relates to the combination of a limited articulating trailer system that includes a trailer having at least one load bearing frame member mounting vertically pivotal hitch member, and at least one 360 degree pivoting or swivel wheel, i.e., pivotal about a horizontal plan.

It is not unusual in today's society to see a variety of vehicles towing different trailer systems, particularly items of a recreational nature. A common sight is a flat bed trailer containing snow riding vehicles or motorcycles to be taken to remote locations for riding. A typical trailer system comprises a towing vehicle having a balled trailer receiving member, where the trailer includes a complementary cup to override the balled member and be secured thereto. Alternatively, the towing vehicle may be equipped with a vehicle connection member, which as known in the art, comprises a generally rectangular channel, such as a 2 inch receiver, for telescopically engaging a complementary member, where the respective members have aligned apertures for removably receiving a locking pin. Whatever the hitching mechanism, where the trailer tongue may be several feet long, a common feature thereof is the provision of a pivoting member, pivotal in all planes, to allow towing of the trailer around corners, and to accommodate the terrain changes, etc. This may be adequate on the open road, but it can present problems when it is necessary to turn and avoid obstacles in a road or in tight turns. The problem is the result of the trailer not following precisely the track of the towing vehicle. That is, the trailer may be readily steered to avoid such obstacles, however, the trailer follows a different track and may not avoid the road obstacle. With such hitching mechanisms, the driver may have to make a wide exaggerated turn just to ensure the safety of the trailer and its contents. Another shortcoming of such hitching mechanisms is the difficulty of backing up, a maneuver that can only be accomplished by an experienced driver.

U.S. Pat. No. 5,531,468, to White illustrates a complex system that at least addresses the latter problem. The patent teaches an articulated trailer utilizing two pivot points and an angular transfer system to control the radial movement of the front axle during turning. The articulated trailer comprises an elongated carriage having two spaced-apart, wheeled axles, where the rear axle rigidly attaches to the carriage while the front axle is pivotally mounted. The carriage front end comprises two spaced-apart pivot points, a hollow jack column assembly and a tongue assembly. A structural assembly supports the jack column assembly and the tongue assembly. A draw bar extends from the tongue assembly to the draft vehicle. Tie-rods attach the ends of the upper tongue assembly to a pair of plates. The plates are interconnected by a shaft. A responder plate is coupled to an electric motor. The electric motor selectively rotates to effect the radial movement of the tongue assembly to transfer angular movement to the jack column assembly. Therefore, the electric motor controls the radial movement of the front axle independently of the draft vehicle movement. Thus, the direction of travel of the trailer can be selectively controlled. Limit devices control the angular movement of the jack column assembly and the tongue. When backing the trailer, a locking system may be deployed to prevent pivotal movement of the jack column assembly and the tongue assembly while permitting the unimpeded radial movement of the draw bar.

The present invention provides a simple, yet effective means to tow a variety of selected objects, even by an unskilled driver. The manner by which the present invention achieves the desired goals hereof will become more apparent in the description which follows.

SUMMARY OF THE INVENTION

The present invention teaches non limited articulating trailer hitch mechanisms, where the trailer when attached thereto to a towed vehicle is pivotal only in a vertical plane. The system hereof, in combination with the towing vehicle that includes a generally rectangular or tubular channel member for telescopically engaging a complementary rectangular channel member, as known in the art, comprises a trailer with hitch mechanism for receipt within the generally rectangular channel member, preferably formed of steel or high strength aluminum channels. The trailer, mounting the hitch mechanism and positioning the trailer in close proximity to the towing vehicle, comprises a generally horizontal, load bearing frame, preferably of steel or aluminum, that may include at least a front frame member, a rear frame member, and a pair of side frame members. In a first embodiment the rear member preferably mounts pivoting wheels, pivotal in a horizontal plane of up to about 360 degrees. The hitch mechanism comprises a first generally rectangular channel member fixed to the front frame member, such as by welding, and a generally rectangular pivotal member mounted at a first end for pivotal movement in a vertical plane relative to the fixed channel member. In a preferred embodiment hitch mechanism the first end includes a pair of parallel walls spaced-apart to be received onto the fixed channel member, where the respective members have aligned apertures for receiving a pivot pin. Finally, the free (female) end of the pivotal member is of a size for telescopically engaging the generally rectangular (male) member on the towing vehicle. A second embodiment for the trailer, for a more even distribution of the load bearing weight, may include pivoting wheels along the front frame member. Further, alternate hitch mechanisms are contemplated, where the mechanism allows for limited vertical movement to accommodate terrain changes.

Accordingly, an object of the present invention is a limited articulating hitching mechanism that limits movement of the mechanism in essentially only a vertical plane to thus control the trailing track of the towed vehicle by forcing the trailer to follow the towing vehicle in a parallel plane.

Another object hereof is the provision of a trail hitch mechanism and trailer that can be easily backed up for storage, even by an inexperienced driver.

A further object of the invention lies in the use of 360 degree horizontally pivoting (or swivel) wheels that help to assure the desired tracking of the towed vehicle to that of the towing vehicle, and to further ensure that the sides of the trailer remain constantly parallel to the sides of the towing vehicle, to thereby make in effect making the trailer an true extension of the towing vehicle.

These and other objects of the invention will become more apparent from the following description, particularly when read in conjunction with the accompanying drawings and the accompanying claims.

BRIEF DESCRIPTION OF DRAWINGS

FIG. 4 is a side view of a swivel wheel for mounting to the trailer frame of the invention.

FIG. 5 is a top view of the swivel wheel of FIG. 4.

FIG. 7 is a partial side of a modified channel hitching member, circular in this configuration, to allow a limited vertical movement of the trailer over uneven terrain.

FIGS. 8 and 9, respectively, are side and top views of a modified single joint hitch mechanism.

FIGS. 10 and 11, respectively, are side and top views of a modified double joint hitch mechanism.

DETAILED DESCRIPTION OF PREFERRED EMBODIMENT

Figure 1:
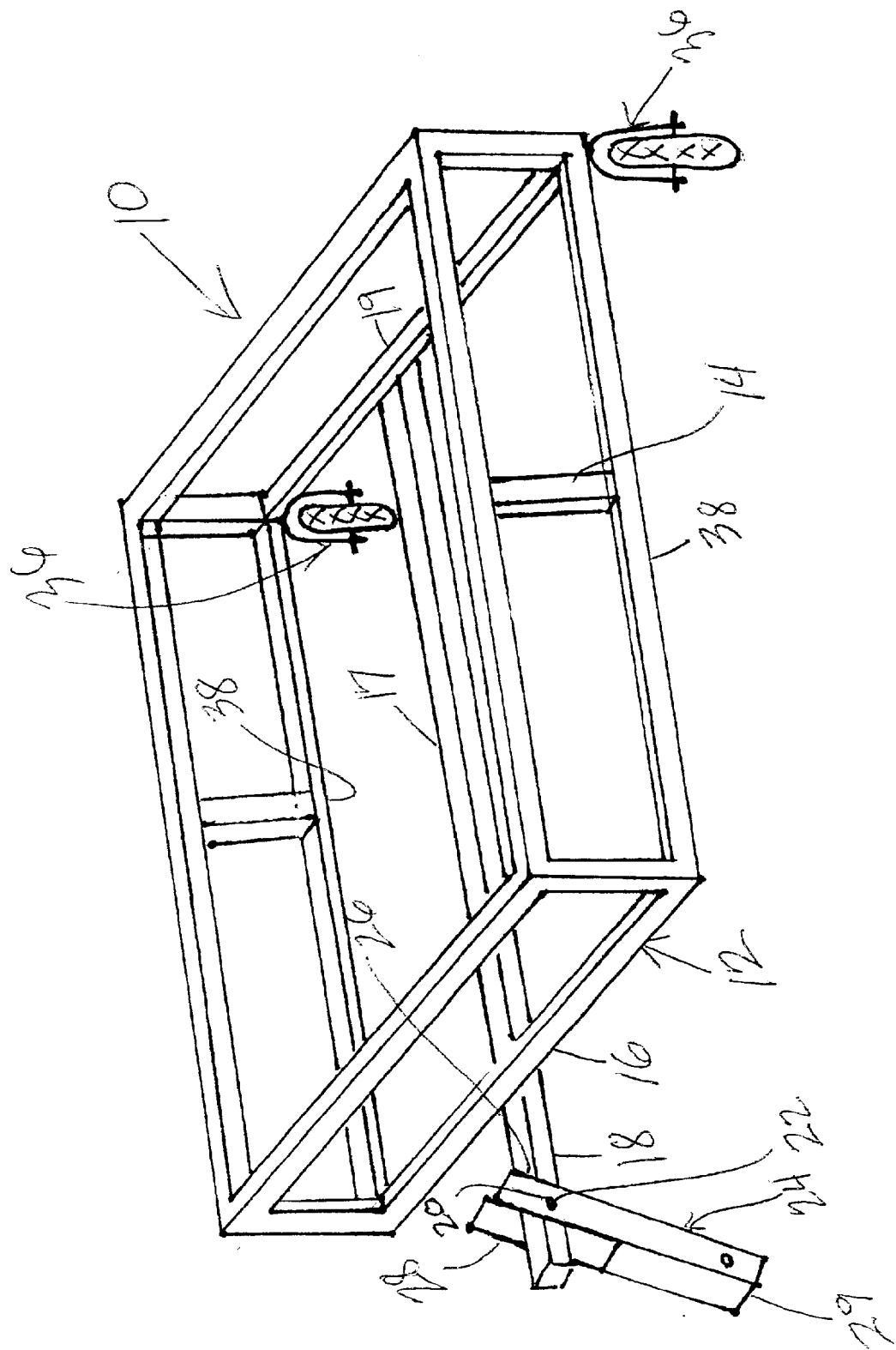
FIG. 1 is a perspective view of the trailer and hitch mechanism according to the present invention, where the hitch connection member is shown in a downward pivoted position.

The present invention relates to a trailer and limited articulating hitch mechanisms, where the hitch mechanisms are pivotal in a vertical plane. This allows the trailer to readily follow the terrain, while limiting the tracking of the towed vehicle to the tracking alignment of the towing vehicle. The trailer and non limited articulating hitch mechanism will now be described with regard to the accompanying Figures, where like reference numerals represent like components or features throughout the several views.

Figure 2:
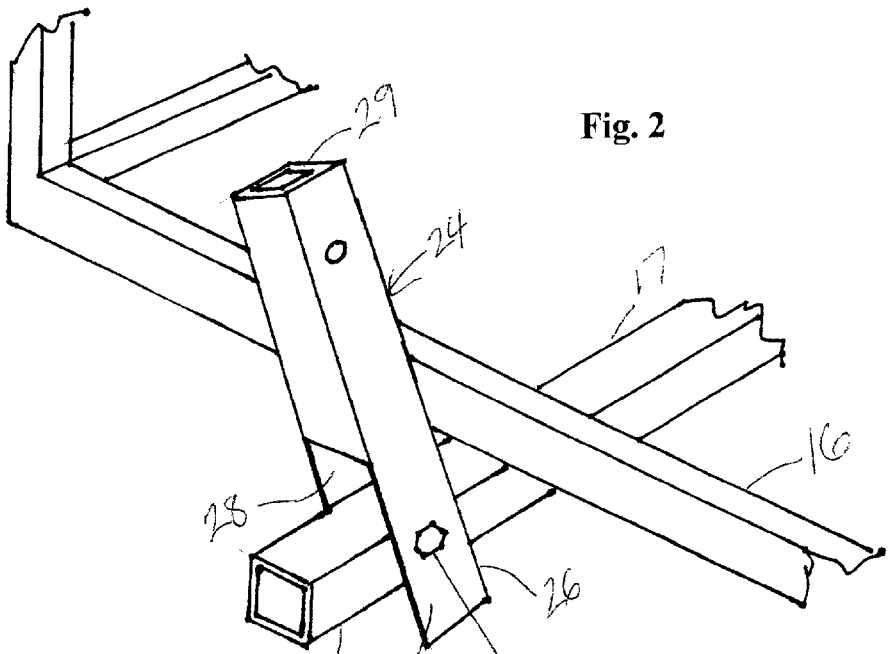
FIG. 2 is a partial perspective view of the hitch mechanism hereof, where the hitch connection member is shown in an upward pivoted position.
Figure 3:
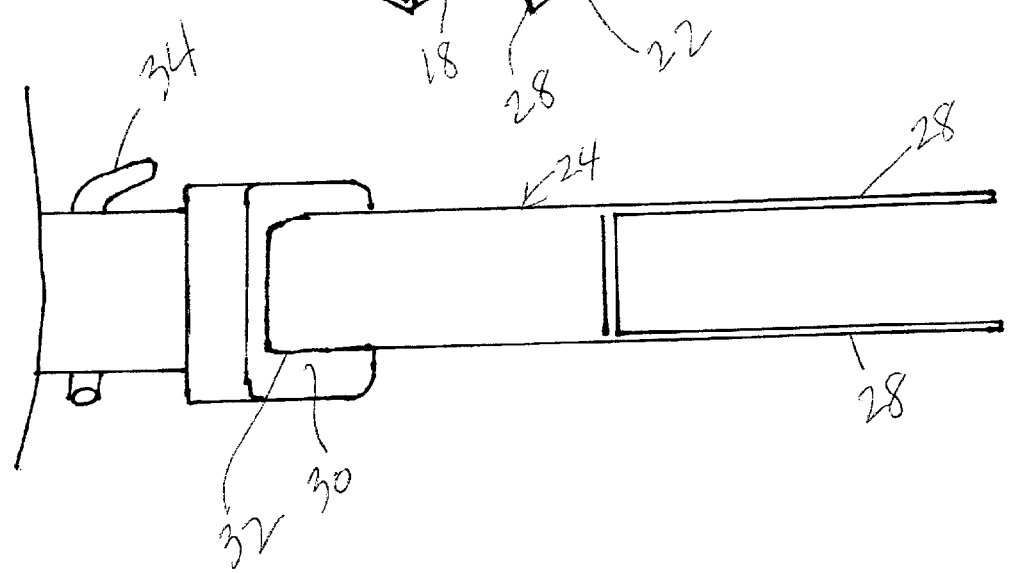
FIG. 3 is a partial, top perspective view of the hitch mechanism of the invention, with the pivotal hitch connection member removably attached to a generally rectangular channel member, as known in the art, secured to the frame of the towing vehicle.

Turning now to FIGS. 1–3, a first embodiment of the trailer 10 of the present invention, and the critical features thereof, comprises a generally rectangular, load supporting frame 12, preferably formed of rectangular, tubular framing members, and fabricated of steel or high strength aluminum. Upstanding from the respective supporting frame 12 may be plural frame walls 14 to further stabilize the system and provide an open enclosure to contain objects to be transported therein. While the foregoing represents a preferred supporting frame 12, it is recognized that variations or changes may be made to such supporting frame within the scope of the present invention.

Extending forward from and secured to the front frame member 16 is a first member 18 forming a part of the a first hitch mechanism of the invention, where such first member may be an extension of the continuous central member 17 extending from the rear frame member 19. Intermediate the length of the first member 18 are a pair of aligned apertures 20 for receiving a pivot pin 22, as more clearly described later. Pivotally mounted to said pivot pin 22 is a vertically movable connection member 24. The connection member 24, generally rectangular in cross section, and as best seen in FIGS. 2 and 3, comprises a first end 26 featuring a pair of side wall extension members 28, where each said side wall extension contains an aperture for aligning with and receiving the pivot pin 22, and a second or free end 29. As will be apparent in FIGS. 1 and 2, the connection member 24 is pivotal in only a vertical plane which restricts lateral movement of the trailer 12 while allowing the trailer to follow the terrain with ease.

FIG. 3 is a top, perspective view of the first hitch mechanism showing the connection member 24 removably secured in a towing mode. Specifically, the Fig. shows the side wall extension members 28 being spaced-apart sufficiently to slidably and rotatably receive the connection member 24. Additionally, for purposes of illustration, there is shown a conventional rectangular channel member 30, preferably secured to the frame of the towing vehicle, which features an opening 32 for telescopically receiving the complementary shaped free end 29. To removably secure the respective members 24, 30, a pin 34 passing through aligned apertures may be used.

Since a feature of the trailer 12 of the present invention is to ensure the trailer tracks the towing vehicle properly, a pair of swivel wheels assemblies 36 is provided, see FIGS. 4 and 5. The wheel assemblies 36, as illustrated in FIGS. 1, 4 and 5 are preferably mounted at the rear of the trailer 12, such as along the rear frame member 19. Alternatively, such wheel assemblies may be moved to a more forward position and mounted to the underside of side frame members 38.

Turning specifically to FIGS. 4 and 5, the wheel assemblies 36 comprise a U-shaped housing featuring a base 40 and a pair of spaced-apart, angled, side walls 42 extending from the base. By offsetting the side walls from the mounting axle, as discussed below, allows for easy control and turning of the trailer. Continuing with the wheel assemblies, the base includes an axle 41, extending upwardly therefrom, mounting a circular ring 43, with grease fitting 45, where the ring 43 is biased upwardly by coil spring 45. The upper end of axle 41 is threaded to receive lock nut 47 for attachment to the trailer frame. Finally, the respective side walls, in proximity to the free end 44 thereof, include an opening to receive and secure an axle 46, such as by a threaded nut 47, where a wheel 48 is rotatively mounted on said axle between said side walls 42.

Figure 6:
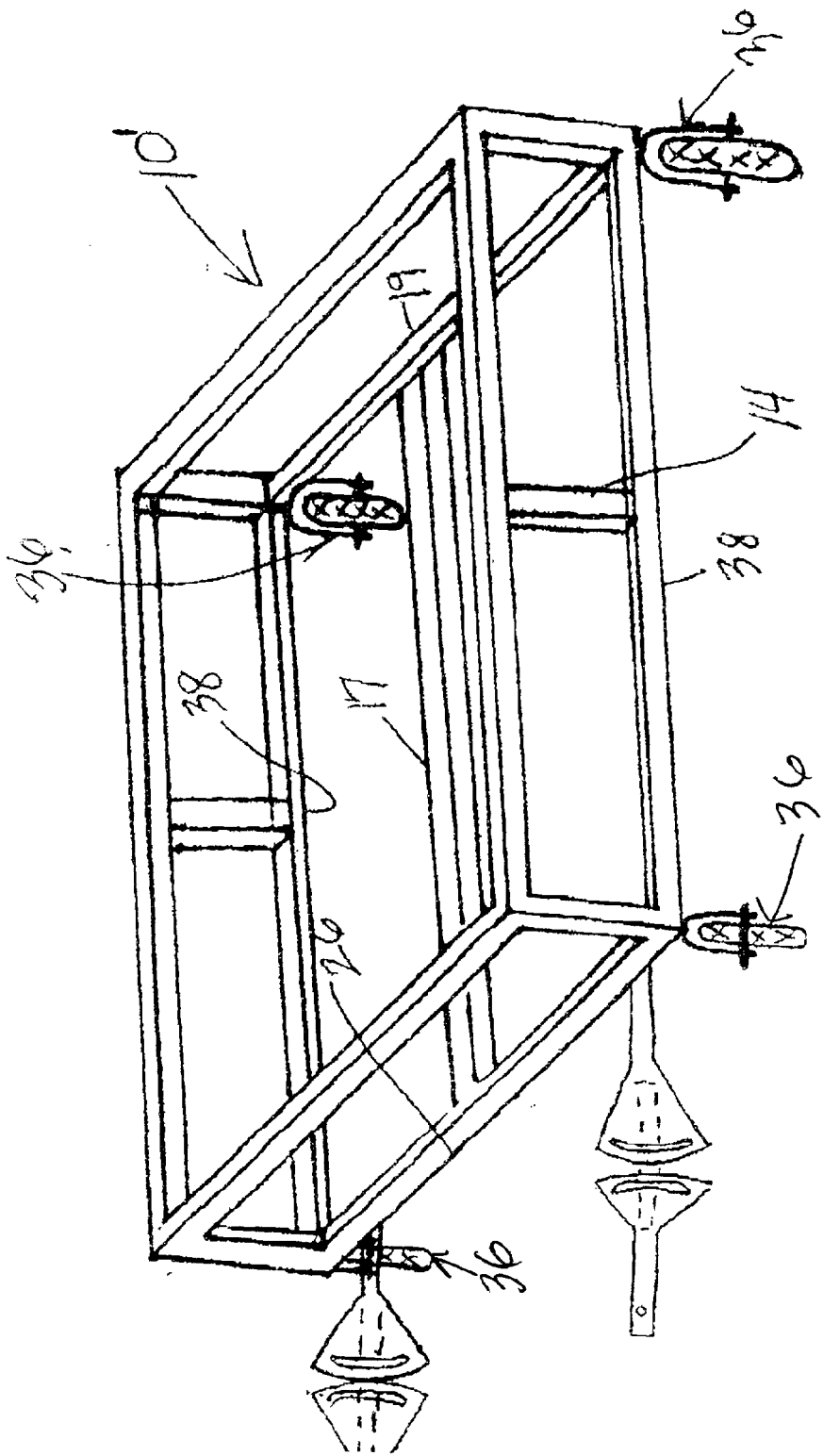
FIG. 6 is a perspective view, similar to FIG. 1, showing a second embodiment for the trailer and modified hitch mechanism, according to the present invention.

FIG. 6 illustrates a second embodiment for the trailer 10' of the invention by the inclusion of a further pair of wheel assemblies 36 secured to the front frame member 26. This provision helps to more evenly distribute the weight of the trailer load.

FIGS. 7–11 are different views of alternate embodiments for the hitch mechanism of the invention, where such embodiments show convenient ways to allow limited vertical movement of the system hereof to accommodate terrain changes. It will be noted that in the hitch mechanism of FIG. 1, the first member 18 includes a pair of aligned apertures 20 to pivotally receive a pivot pin 22 for rotatable mounting connection member 24. In the embodiment of FIG. 7, the aligned apertures have been replaced by an arcuate slot 50 for limited vertical movement.

For a greater such vertical movement, FIGS. 8–11 illustrate two modified joint hitch mechanisms. FIGS. 8 and 9 show a single joint hitch mechanism 52 having a triangular plate member 54, that includes an arcuate slot 56, secured to the first member 18. The connecting member 24 includes a pivot pin 22 that rides along the arcuate slot 50 like a cam follower. A double hitch mechanism 58 is shown in FIGS. 10 and 11. In this embodiment both the first member 18 and the connecting member 24 mount triangular plates 60, 62, respectively, each having arcuate slots 63, but further include an intermediate member 64, where said intermediate member is pivotally mounted at its ends by pins 66, 68. Additionally, the intermediate member 64 includes a pair of pin members 70, 72 that ride along the respective slots 63, particularly as the trailer moves over uneven terrain. Finally, with the latter or double joint hitch mechanism, a modified or double hitch is required for the towing vehicle.

It is recognized that changes, modifications and variations may be made to the trailer and hitch mechanism of the present invention, particularly by those skilled in the art, without departing from the spirit and scope thereof. Accordingly, no limitation is intended to be imposed thereon except as set forth in the accompanying claims. All patents, applications and publications referred to herein are incorporated by reference in their entirety.

What is claimed is:

1. A vehicle trailer and trailer hitch assembly for being received by a vehicle hitch assembly, comprising:
   a) a trailer comprising,
      i) a generally rectangular frame of rigid members,
      ii) an elongated hitch tongue member extending from said frame, said hitch tongue member having at least one vertical arcuate slot defined therein,
      iii) a pin pivotably receivable within said at least one slot,
   b) a trailer hitch mountable to said vehicle hitch assembly, comprising,
      i) an elongated hitch connection member having a pair of opposing generally parallel fingers extending therefrom, each finger having an aperture defined therein for receiving said pin such that said trailer hitch can vertically pivot, vertically slide and have limited rotational movement within said slot with respect to said elongated hitch member; and,
   c) a plurality of wheel assemblies associated with said frame, each wheel assembly being capable of 360 degree swiveling about a vertical axis.

2. The vehicle trailer and trailer hitch assembly of claim 1, wherein said at least one arcuate slot comprises a pair of arcuate slots defined on opposite sides of said hitch tongue member.

* * * * *